United States Patent
Ravindra

(10) Patent No.: US 11,494,949 B2
(45) Date of Patent: Nov. 8, 2022

(54) PUBLICATION MODIFICATION USING BODY COORDINATES

(71) Applicant: eBay Inc., San Jose, CA (US)

(72) Inventor: Shreyas Ravindra, San Ramon, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/354,755

(22) Filed: Mar. 15, 2019

(65) Prior Publication Data

US 2020/0043200 A1 Feb. 6, 2020

Related U.S. Application Data

(63) Continuation of application No. 15/081,236, filed on Mar. 25, 2016, now Pat. No. 10,262,440.

(51) Int. Cl.
*G06T 11/00* (2006.01)
*G06Q 30/06* (2012.01)
*G06T 7/62* (2017.01)

(52) U.S. Cl.
CPC .......... *G06T 11/00* (2013.01); *G06Q 30/0643* (2013.01); *G06T 7/62* (2017.01); *G06T 2207/30196* (2013.01); *G06T 2210/16* (2013.01)

(58) Field of Classification Search
None
See application file for complete search history.

(56) References Cited

U.S. PATENT DOCUMENTS

| | | |
|---|---|---|
| 5,930,769 A | 7/1999 | Rose |
| 6,307,568 B1 | 10/2001 | Rom |
| 7,099,734 B2 | 8/2006 | Pieper et al. |
| 7,346,421 B2 | 3/2008 | Bijvoet |
| 7,421,306 B2 | 9/2008 | Adiseshan |
| 7,433,753 B2 | 10/2008 | Okada et al. |
| 7,522,165 B2 | 4/2009 | Weaver |
| 7,657,340 B2 | 2/2010 | Lind |
| 7,953,648 B2 | 5/2011 | Vock |
| 8,078,498 B2 | 12/2011 | Edmark |
| 8,275,590 B2 | 9/2012 | Szymczyk et al. |
| 8,321,301 B2 | 11/2012 | Manea et al. |
| 9,241,184 B2 | 1/2016 | Weerasinghe |
| 9,286,715 B2 | 3/2016 | Coon et al. |
| 9,286,727 B2 | 3/2016 | Kim et al. |
| 10,052,026 B1* | 8/2018 | Tran ................ A61B 5/165 |
| 10,204,375 B2* | 2/2019 | Su ................... G06F 16/532 |

(Continued)

OTHER PUBLICATIONS

Final Office Action received for U.S. Appl. No. 15/081,236, dated Nov. 17, 2017, 35 pages.

(Continued)

*Primary Examiner* — Jason A Pringle-Parker
(74) *Attorney, Agent, or Firm* — Holland & Hart LLP

(57) ABSTRACT

In various example embodiments, a system and method for modifying publications of a network-based publication system are presented. The system receives a set of body coordinates from a client device and associates the set of body coordinates with a user account. The system identifies a set of clothing images within a set of publications retrieved as a result of a query. The system generates a set of modified clothing images from one or more images of the set of clothing images and causes presentation of the set of modified clothing images at the client device.

19 Claims, 13 Drawing Sheets

(56) References Cited

U.S. PATENT DOCUMENTS

| | | | |
|---|---|---|---|
| 10,262,440 B2 | 4/2019 | Ravindra | |
| 2002/0107762 A1 | 8/2002 | Kunigita | |
| 2002/0188372 A1 | 12/2002 | Lane et al. | |
| 2003/0016844 A1* | 1/2003 | Numaoka | G06T 17/00 382/100 |
| 2003/0101105 A1* | 5/2003 | Vock | G06Q 10/043 705/27.2 |
| 2007/0182736 A1 | 8/2007 | Weaver | |
| 2007/0198118 A1 | 8/2007 | Lind | |
| 2008/0117232 A1* | 5/2008 | Edmark | G06Q 30/0641 345/630 |
| 2009/0213117 A1 | 8/2009 | Weaver | |
| 2010/0030578 A1* | 2/2010 | Siddique | H04W 4/00 705/26.1 |
| 2010/0106475 A1* | 4/2010 | Smith | G16H 50/50 703/11 |
| 2010/0111370 A1 | 5/2010 | Black et al. | |
| 2012/0086783 A1* | 4/2012 | Sareen | G06N 3/006 348/47 |
| 2015/0134493 A1* | 5/2015 | Su | G06T 15/005 705/27.2 |
| 2015/0134495 A1* | 5/2015 | Naware | A41H 1/00 705/27.2 |
| 2015/0154691 A1* | 6/2015 | Curry | G06F 30/23 705/27.2 |
| 2015/0279098 A1* | 10/2015 | Kim | G06T 17/30 345/420 |
| 2015/0302505 A1* | 10/2015 | Di | G06V 40/10 705/26.7 |
| 2015/0324103 A1* | 11/2015 | Tepmongkol | G06Q 50/01 715/757 |
| 2016/0155186 A1* | 6/2016 | Su | G06Q 30/0643 705/27.2 |
| 2016/0247017 A1* | 8/2016 | Sareen | G06T 7/60 |
| 2017/0245570 A1* | 8/2017 | Yuen | A41D 1/06 |
| 2017/0278272 A1 | 9/2017 | Ravindra | |
| 2018/0047192 A1* | 2/2018 | Kristal | G06Q 30/0643 |
| 2018/0165737 A1* | 6/2018 | Love | G06Q 30/0621 |
| 2019/0050427 A1* | 2/2019 | Wiesel | G06V 40/10 |
| 2019/0385206 A1* | 12/2019 | DeLuca | G10L 15/30 |

OTHER PUBLICATIONS

First Action Interview Office Action for U.S. Appl. No. 15/081,236, dated May 1, 2017, 7 pages.

Non-Final Office Action Received for U.S. Appl. No. 15/081,236 dated Jul. 18, 2017, 26 pages.

Non-Final Office Action received for U.S. Appl. No. 15/081,236, dated May 17, 2018, 31 pages.

Notice of Allowance received for U.S. Appl. No. 15/081,236, dated Dec. 3, 2018, 5 pages.

Response to Final Office Action filed on Apr. 17, 2018, for U.S. Appl. No. 15/081,236, dated Nov. 17, 2017, 19 pages.

Response to Non-Final Office Action filed on Aug. 15, 2017, for U.S. Appl. No. 15/081,236, dated Jul. 18, 2017, 19 pages.

Response to Non-Final Office Action filed on Aug. 17, 2018, for U.S. Appl. No. 15/081,236, dated May 17, 2018, 16 pages.

U.S. Appl. No. 15/081,236, filed Mar. 25, 2016, Publication Modification Using Body Corrdinates, U.S. Pat. No. 10,262,440.

\* cited by examiner

PUBLICATION MODIFICATION USING BODY COORDINATES

CLAIM OF PRIORITY

This applications is a continuation of and claims the benefit of priority of U.S. application Ser. No. 15/081,236, filed Mar. 25, 2016, which is hereby incorporated by reference in its entirety.

TECHNICAL FIELD

Embodiments of the present disclosure relate generally to user interface modification and, more particularly, but not by way of limitation, to modifying network-based publications based on identified body coordinates.

BACKGROUND

Conventionally, determining a fit of clothing around a body is performed by physically selecting and trying on clothing. Some clothing information may provide sizes or measurements. Users interacting with the clothing information in a computer system may attempt to compare measurements with their own body to estimate whether clothing purchased online will fit. Due to variability in clothing sizes current methods of estimating fit presents difficulties and is prone to error.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, methods and systems for a publication modification system are presented. A user may interact with the publication modification system to identify the fit of articles of clothing through an online or other network-based system. The publication modification system receives body coordinates from the user in the form of an optical body scan, a series of images, or a set of measurements. The publication modification system generates a set of body coordinates in a body coordinate file. In some instances, the body coordinate file may be a three dimensional representation of the body coordinates or may be a data structure including the information provided by the user. Upon accessing a publication system, the publication modification system may receive input from a user searching for clothing products within the publication system. The publication modification system may identify publications or item listings based on a search query provided by the user and the set of body coordinates in the body coordinate file. The publication modification system may retrieve the publications or item listings and modify the publications or item listings to present color, pattern, or other distinguishing representations of whether the clothing will fit and locations on the clothing indicating variations in the fit (e.g., places the clothing will loosely or tightly fit).

Figure 1:
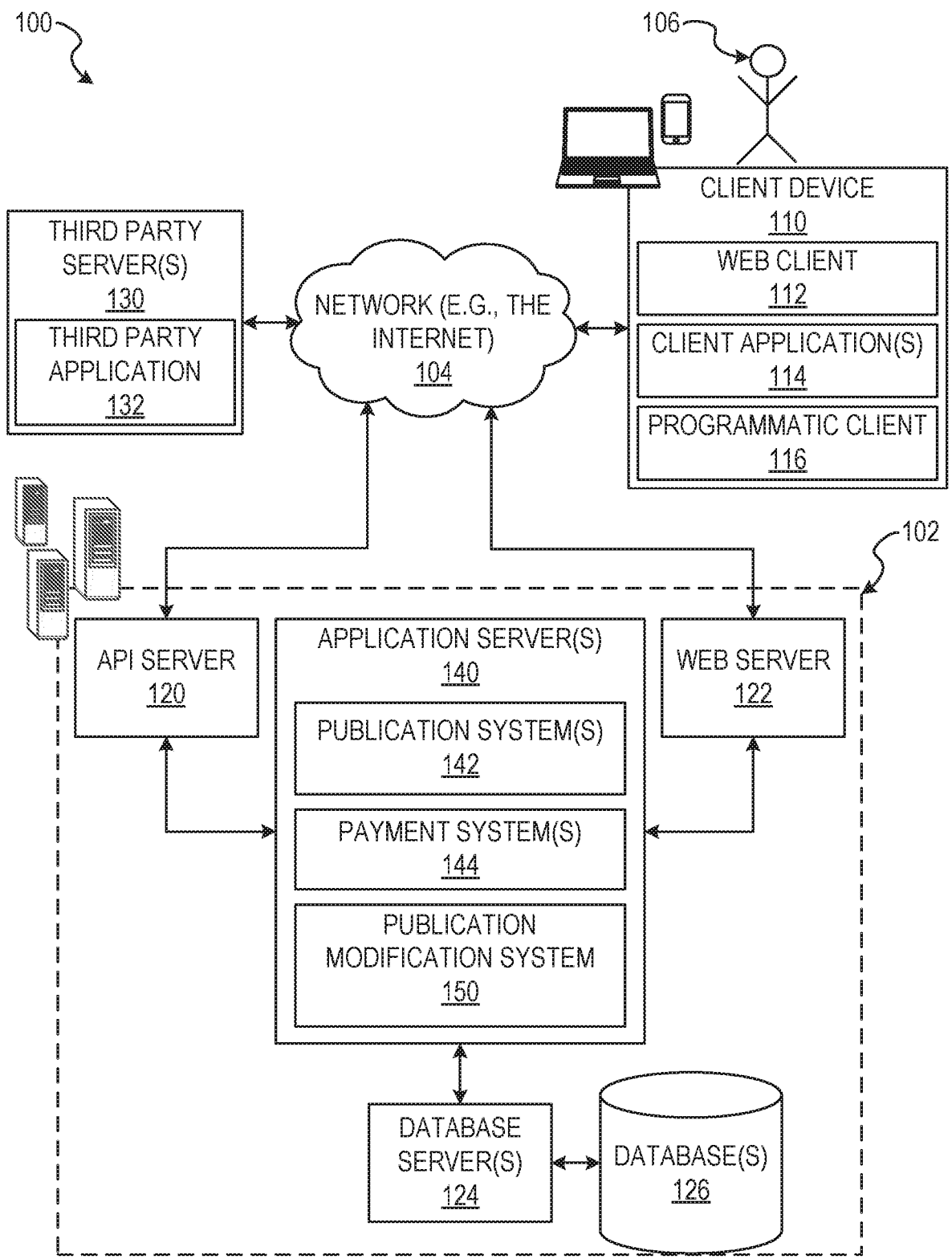
FIG. 1 is a block diagram illustrating a networked system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but is not limited to, a mobile phone, desktop computer, laptop, a portable digital assistant (PDA), a smart phone, a tablet, an ultra book, a netbook, a laptop, a multi-processor system, microprocessor-based or programmable consumer electronics, a game console, a set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (UPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications 114 (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application 114 is configured to locally provide the user interface and at least some of the functionalities with the application 114 configured to communicate with the networked system 102, on an as needed basis, for data and/or processing capabilities not locally available (e.g., access to a database of items available for sale, to authenticate a user 106, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The publication modification system 150 may provide functionality operable to perform various modifications to publications of the publication system 142. In some embodiments, the modifications performed by the publication modification system 150 may be based on sets of body coordinates, clothing dimensions, or selections of user accounts. For example, the publication modification system 150 accesses publications and identifies images and descriptions within the publications. The publication modification system 150 may modify images and text of publications on a temporary basis for presentation at a client device. In some example embodiments, the publication modification system 150 analyzes images within publications to determine regions of interest or dimension regions within the images. The dimension regions may be associated with specified clothing dimensions and body coordinates. The publication modification system 150, using provided body coordinates, may modify images to indicate a fit of the clothing with respect to the provided body coordinates. In some example embodiments, the publication modification system 150 modifies publications based on selection of a first user account by a second user, enabling interaction with publications on behalf of the first user and using body coordinates of the first user without revealing clothing dimensions or body coordinate information to the second user.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and publication modification system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
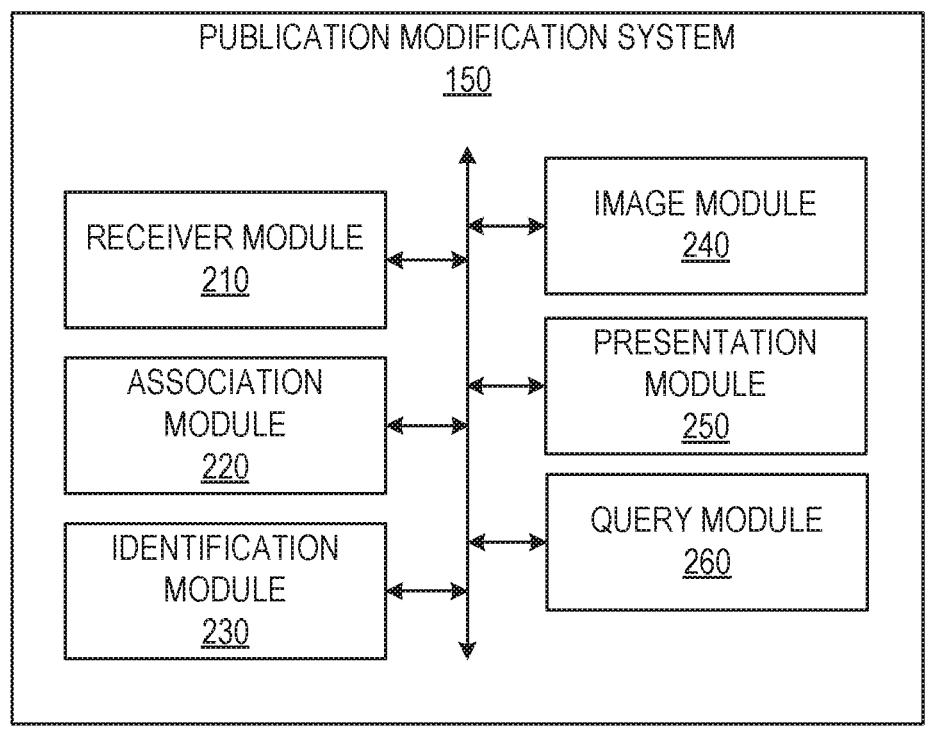
FIG. 2 is a block diagram of an example publication modification system, according to various embodiments.

FIG. 2 is a block diagram illustrating components of the publication modification system 150, according to some example embodiments. The publication modification system 150 is shown as including a receiver module 210, an association module 220, an identification module 230, an image module 240, a presentation module 250, a query module 260 all configured to communicate with one another (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform operations for which that module is designed. Moreover, any two or more of these modules may be combined into a single module, and the functions described herein for a single module may be subdivided among multiple modules. Furthermore, according to various example embodiments, modules described herein as being implemented within a single machine, database(s) 126, or device (e.g., client device 110) may be distributed across multiple machines, database(s) 126, or devices.

The receiver module 210 receives sets of body coordinates and user interface selections. In some embodiments, in receiving sets of body coordinates, the receiver module 210 may receive communications via the network 104. The receiver module 210 may access the set of body coordinates on the third party server 130 or another networked location in response to user interface selections configured to trigger access of the set of body coordinates.

The association module 220 associates sets of body coordinates with user accounts. The association module 220 may receive a set of body coordinates from the receiver module 210. The association module 220 may association a set of body coordinates with a user account based on the set of body coordinates being received by the receiver module 210 from a client device logged into the user account, a client device associated with the user account, or where the set of body coordinates or a transmission including the set of body coordinates includes an indication of the user account.

The identification module 230 may identify sets of images within publications of the publication system 142. In some instances, the identification module 230 identifies clothing dimensions associated with clothing depicted within a set of images in the publication. The identification module 230 may also identify locations or dimension regions within clothing images which correspond to portions of the clothing dimensions and the set of body dimensions.

The image module 240 modifies publications based on the set of body coordinates, clothing dimensions, and user accounts. In some instances, the image module 240 modifies clothing images within a publication to reflect regions of clothing which fit (e.g., body coordinates correspond to clothing dimensions) or which lack a proper fit. The image module 240 may also modify text and user interface elements within publications based on the set of body coordinates, the clothing dimensions, and user accounts.

The presentation module 250 causes presentation of modified publications. In some instances, the presentation module 250 causes presentation by transmitting data indicative of the publications to the client device 110. In some instances, the presentation module 250 is implemented within the publication system 142 in the context of a web application, a server based application, or a client-side application 114 (e.g., all or a portion of an application stored on the client device 110).

The query module 260 may receive and execute queries for publications on the publication system 142. The query module 260 receives selections via a user interface from the client device 110. Based on receiving the selections, the query module 260 generates and executes queries against the database 126 of the publication system 142 to surface publications incorporating clothing dimensions.

Figure 3:
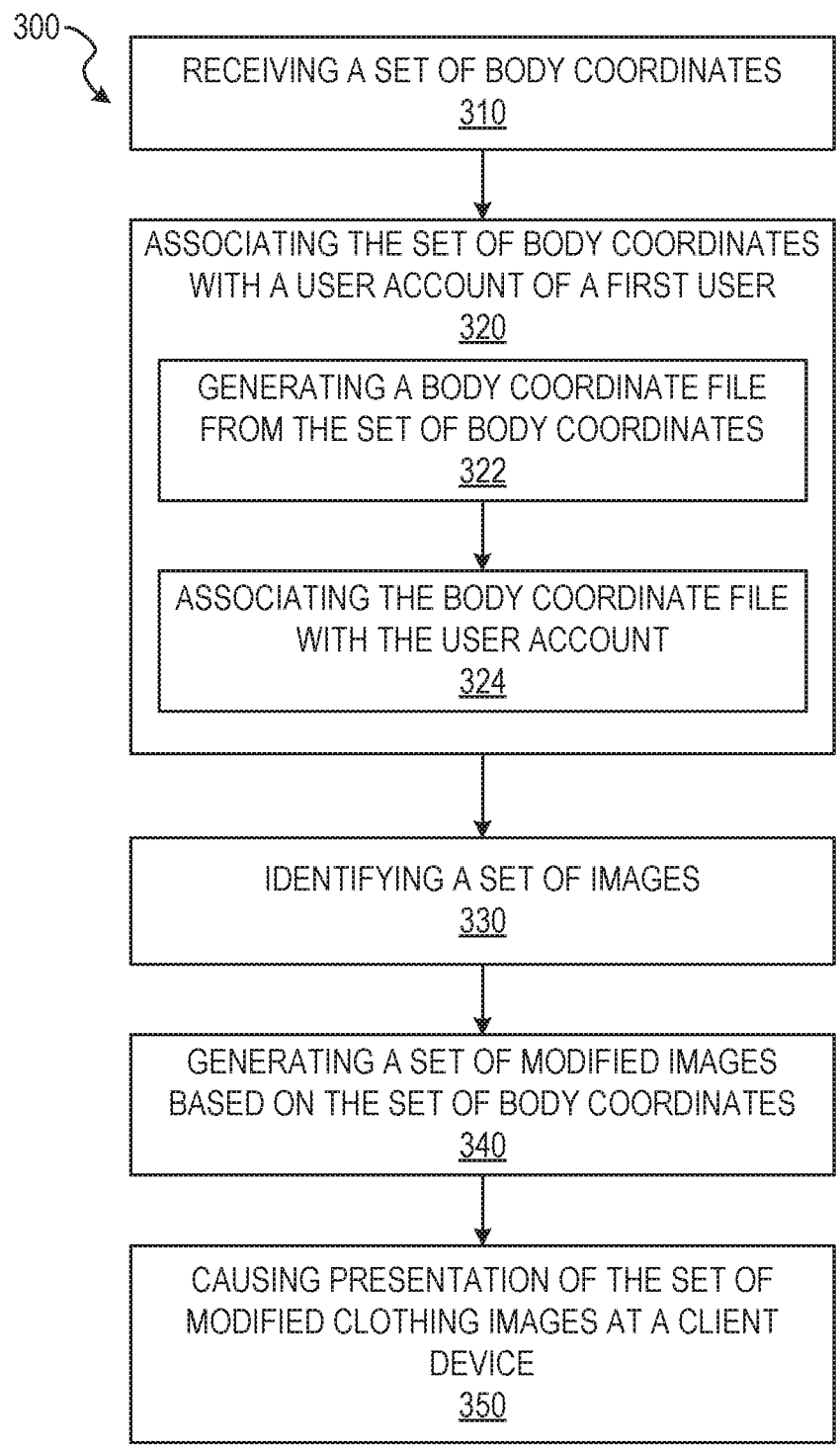
FIG. 3 is a flow chart illustrating an example method according to various embodiments.

FIG. 3 is a flow chart of operations of the publication modification system 150 in performing a method 300 of identifying and generating a set of modified images for a publication on a network-based publication system, according to some example embodiments. Operations in the method 300 may be performed by the publication modification system 150, using modules described above with respect to FIG. 2.

Figure 4:
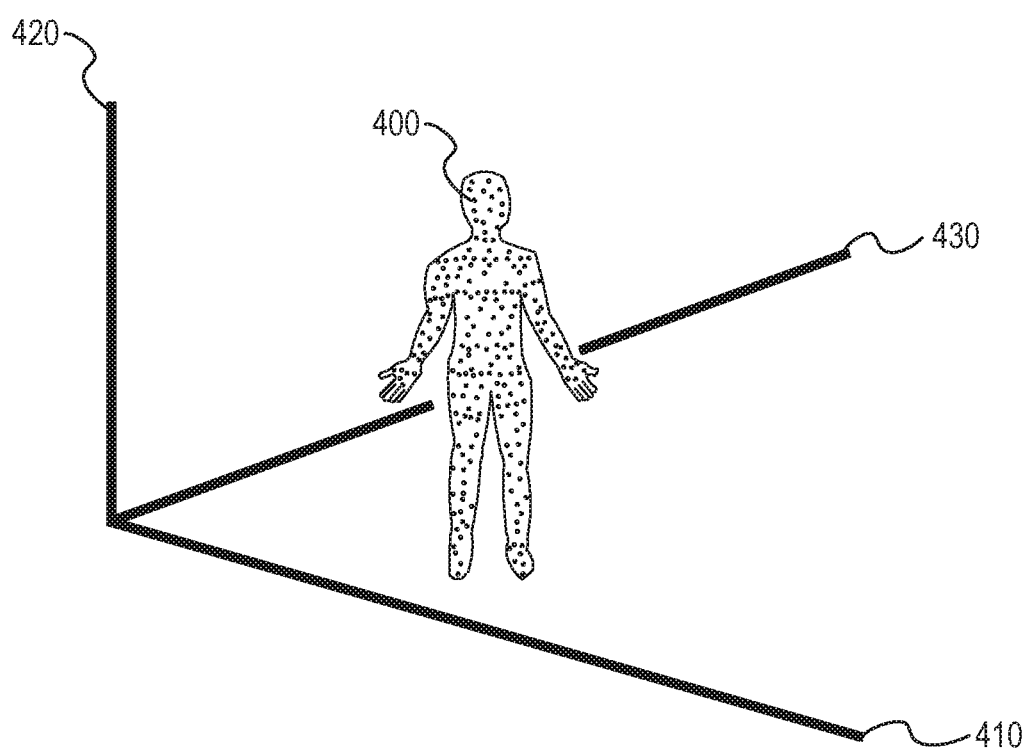
FIG. 4 is a graph depicting a representation of a set of body coordinates, according to various embodiments.

In operation 310, the receiver module 210 receives a set of body coordinates. The set of body coordinates may be a set of coordinates within three dimensional space, such as a 3D coordinate image profile, a series of pictures, or any other set of coordinates or set of images from which the set of body coordinates may be calculated. The receiver module 210 may receive the set of body coordinates from a client device (e.g., the client device 110) associated with a user (e.g., the user 106) or by accessing an account of the user. The client device may transmit or otherwise pass the set of body coordinates to the receiver module 210. The client device may pass the set of body coordinates to the receiver module 210 based on receiving the set of body coordinates from the third party server 130, from an internal storage medium, or from an external storage medium. Where the client device passes the set of body coordinates to the receiver module 210 from an internal or external storage medium, the client device may pass the set of body coordinates as a set of coordinates, a set of measurements, or a set of images. Where the client device passes the set of body coordinates to the receiver module 210 from the third party server 130, the client device may access the set of body coordinates captured, measured, or determined by the third party server 130 and pass the set of body coordinates to the receiver module 210.

Where the receiver module 210 receives the set of body coordinates as a set of coordinates within three dimensional space, the receiver module 310 may pass the set of body coordinates to the association module 220. For example, as shown in FIG. 4, the set of body coordinates may be determined based on an optical scan of a body using one or more optical scanning devices to determine a distance between the body and the optical scanning device at each of the body coordinates of the set of body coordinates. In these embodiments, the optical scanning device identifies coordinates for specific areas, regions, parts of the body, or predetermined points on the body to populate the set of body coordinates. In FIG. 4, the points on the body to be scanned are represented by dots 400. Each of the points may be provided with a measurement or value for each of the three axes, an x axis 410, a y axis 420, and a z axis 430.

The optical scanning device may identify coordinates associated with one or more height measurement, one or more head measurement (e.g., head circumference for a hat size), one or more shoulder measurements, one or more arm measurements (e.g., length of arms and circumference of arms), one or more chest measurements, one or more abdominal measurements, one or more waist measurements, one or more hip measurements, one or more leg measurements (e.g., length of leg, circumference of leg, and width of leg), and one or more foot measurement (e.g., a length of a foot, a width of a foot, and a shoe size). In some embodiments, the optical scanning device may identify an initial set of coordinates, as shown in FIG. 4, and determine whether an initial set of coordinates 400 includes enough body coordinate points to generate measurements for one or more predetermined regions of the body. Where the initial set of coordinates 400 is insufficient to produce measurements for the regions of the body, the optical scanning device may re-scan to identify and generate coordinates for a subsequent set of coordinates having a number of body coordinate points greater than that of the initial set of coordinates 400. In some instances, the optical scanning device may determine the initial set of coordinates 400 includes more body coordinate points than are necessary to generate measurements or identify fit of clothing (e.g., extraneous body coordinate points within a region used for measurement or extraneous body coordinate points within regions unused for measurement). The optical scanning device, the receiver module 210, the association module 220, or the identification module 230 may remove one or more of the extraneous body coordinate points.

Where the receiver module 210 receives the set of body coordinates as a set of measurements, the receiver module 210 may pass the set of measurements to the image module 240. The image module 240 may generate the set of body coordinates in three dimensional space based on the set of measurements and interrelation of the set of measurements. For example, the set of measurements may include a chest measurement, a waist measurement and a vertical distance between the chest measurement and the waist measurement. The image module 240 may generate the set of body coordinates as a three dimensional model of the chest and waist by generating a set of coordinates having a circumference of the chest measurement and a circumference of the waist measurement spaced a distance apart equal to the vertical distance between the chest and waist measurements.

Where the set of body coordinates are received as a set of images, the identification module 230 or the image module 240 may derive the set of body coordinates from the series or set of images. For example, the identification module 230 may identify two or more images of the series or set of images which depict the same subject from two or more different viewpoints, angles, sides, or directions. The image module 240 may determine the set of body coordinates based on the two or more images identified by the identification module 230. The image module 240 may determine the set of body coordinates by comparing the two or more images or by identifying a scale within the two or more images and determining the body coordinates based on the scale. For example, the two or more images may depict a body in front of a measuring graphic (e.g., one or more rulers or a set of alternating colored boxes of known dimensions). The image module 240 may determine the body coordinates as a plot of coordinates in a three dimensional space based on known dimensions of the measuring graphic.

In some embodiments, the receiver module 210 may access the set of body coordinates on a database external to the publication system 142. For example, the third party server 130 may generate the set of body coordinates from a set of images or a set of scans using one or more measurement instrument (e.g., an optical measurement instrument), as described above. The receiver module 210 may access the set of body coordinates based on an access request from a client device associated with a user account to access the set of body coordinates of the user associated with the user account. For example, the user may enter a booth at a public venue (e.g., a mall, a fair, or a conference) and be imaged or scanned. The booth may transmit a set of images or the scans to the third party server 130 for determination of the set of body coordinates. The booth may provide the user with an access code associated with the set of body coordinates. The user may log into the user account on the publication system 142 and initiate the access request by entering the access code from the booth. Based on the user initiating the access request, the receiver module 210 may access the set of body coordinates using the access code.

In operation 320, the association module 220 associates the set of body coordinates with a user account for a first user. After the receiver module 210 receives the set of body coordinates, the receiver module 210 passes the set of body coordinates to the association module 220. In some embodiments, association module 220 associates the set of body coordinates with the user account by accessing the user account and including a body coordinate file in the user account or in metadata associated with the user account. The body coordinate file may be understood as the set of body coordinates organized into a collection of data under a single identifying name and configured for storage on a processor-readable storage medium.

In some embodiments, the association of the set of body coordinates with the user account for the first user may cause the publication system 142 to temporarily modify publications upon presentation of the publication to a second user. For example, where the second user selects the first user as a recipient of a gift and enters a search query for clothing or other articles for which the set of body coordinates apply, the publication system 142 may present only results which conform to the set of body coordinates or may present publications (e.g., item listings) for clothing as having a single size or no identified size. Where the publication system 142 presents the publications for clothing with no identified size, selection and ordering of the clothing causes the publication system 142 to include within the selection or ordering a size conforming to the set of body coordinates without presenting the size to the second user.

In some embodiments, the operation 320 may be performed using one or more sub-operation. In operation 322, the association module 220 generates a body coordinate file from the set of body coordinates. The association module 220 may generate the body coordinate file by configuring the set of body coordinates from a first organization or format into a second organization or format. For example, the set of body coordinates may be passed to the association module 220 in a format including a graphical representation of the set of body coordinates. The association module 220 may remove the graphical representation and convert the initial format into a second format (e.g., a spreadsheet file, a data table, or an array).

In operation 324, the association module 220 associates the body coordinate file with the user account. As described above, the association module 220 may associate the body coordinate file with the user account by storing the body coordinate file within a set of files or storage unit for the user account or within metadata associated with the user account.

Figure 5:
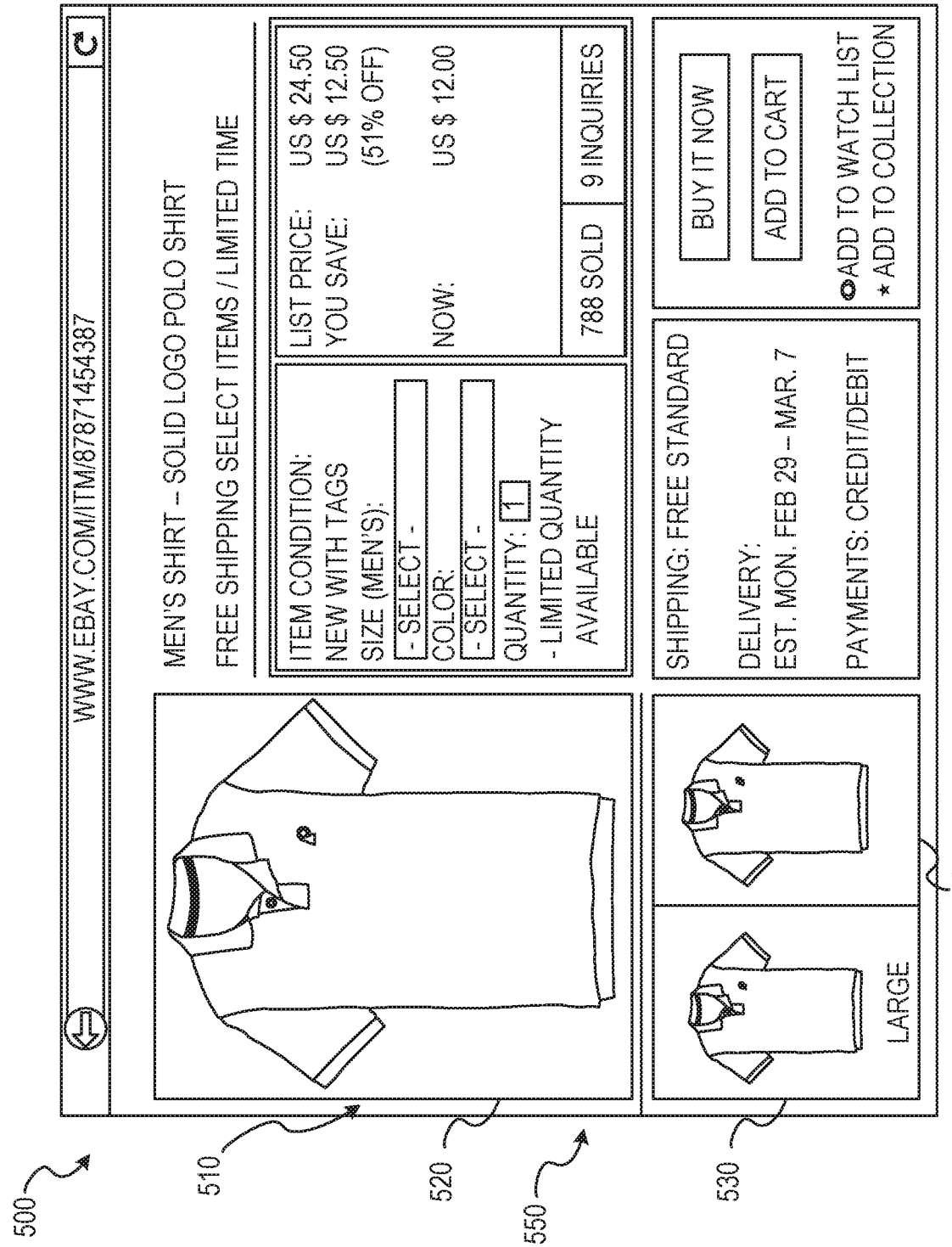
FIG. 5 is an example user interface diagram illustrating a user interface screen including a publication, according to various embodiments.

In operation 330, the identification module 230 identifies a set of images. In some embodiments, the images are a set of images associated with body coordinates. For example, the set of images may be a set of clothing images depicting one or more articles of clothing which cover or otherwise interact with parts of a body represented by one or more body coordinates of the set of body coordinates. As shown in FIG. 5, the identification module 230 may initially identify images 510 within a publication 500 of the publication system 142 by identifying image tags (e.g., metadata tags or file extensions) within data associated with or comprising a publication. Once images 520, 530, and 540 are identified within the publication 500, the identification module 230 may identify the set of images 550 from among the images 510 included within the publication. Where the set of images 550 to be identified are clothing images, or other images having characteristics associated with or interacting with the set of body characteristics, the identification module 230 may identify the set of clothing images 550 from the images 510 of the publication based on descriptions (e.g., keywords or measurements) included in metadata, image recognition techniques (e.g., edge detection or pattern recognition), or any other suitable method of identifying a predetermined content type depicted within an image.

In some embodiments, the identification module 230 identifies the set of images 550 based on receiving a selected publication 500 from a set of publications provided by a query module 260. In these instances, the receiver module 210 receives a query including one or more characteristics of an article of clothing. The query module 260 identifies one or more publications on the publication system 142. The one or more publications represent one or more articles of clothing associated with the one or more characteristics. The presentation module 250 may cause presentation of the one or more publications at a client device (e.g., the client device 110). In response to the presentation of the one or more publications, the receiver module 210 may receive a selection of a selected publication 500 of the one or more publications. The selected publication 500 includes the set of clothing images 550. In response to receiving the selection, the receiver module 210 passes the selection to the identification module 230. The identification module 230, receiving the selected publication 500, may parse the selected publication 500 for clothing images 510, as described above.

Figure 6:
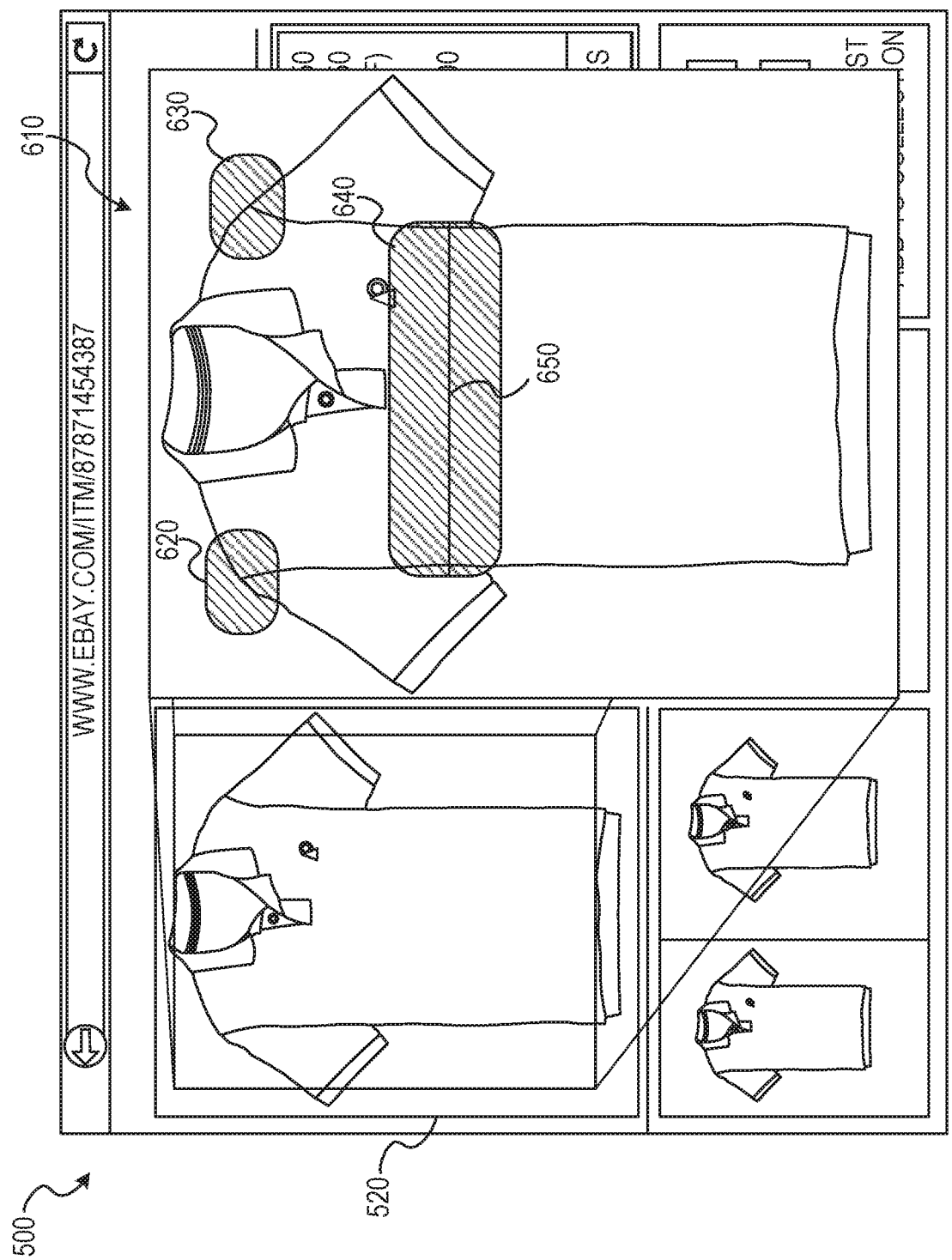
FIG. 6 is an example user interface diagram illustrating a user interface screen modified based on body coordinates, according to various embodiments.

In operation 340, the image module 240 generates a set of modified clothing images 610, as shown in FIG. 6. The set of modified clothing images 610 may include a representation of one or more body coordinate of the set of body coordinates and may be based on the set of body coordinates. In some embodiments, as will be described below in more detail, the image module 240 may generate the set of modified clothing images 610 by modifying one or more color values within the set of clothing images, adding an overlay (e.g., a translucent color, pattern, or shape) to the set of clothing images, modifying one or more shape within the set of clothing images, modifying the set of clothing images using combinations thereof, or modifying the set of clothing images using any other suitable image modification technique. In some embodiments, the image module 240 may generate a set of modified clothing images 610 by generating one or more overlay images or filters for application to the set of clothing images. As shown in FIG. 6, the image module 240 may generate a set of color areas 620, 630, and 640 positioned on the clothing depicted within the image 610. The set of color areas may indicate a portion or portions of the clothing which do not fit the user based on the set of body coordinates, as determined by the identification module 230. In some instances, to modify the one or more images of the set of clothing images, the image module 240 may generate color areas, shapes, or patterns in an overlay. The overlay may be applied to one or more images of the set of clothing images upon selection of a clothing image 520 of the set of clothing images.

The image module 240 may generate the set of modified images 610 as temporary images which may be discarded, deleted, or overwritten after termination of a session of the user account, after a predetermined user interaction with a publication, or based on memory usage requirements. In some instances, the temporary images may be stored in a volatile memory of the client device accessing the publication system 142. The temporary images may also be stored in a volatile memory of the publication system 142. The temporary images may temporarily modify a publication or presentation of a publication of the publication system 142, as described below. The image module 240 may generate the set of modified clothing images 610 upon selection of individual or groups of clothing images of the set of clothing images, upon selection of a publication from a set of results in response to a query, or upon generation of a set of results and retrieval of publications comprising the set of results. As shown in FIG. 6, the modified clothing image 610 may be generated based on selection of the image In operation 350, the presentation module 250 causes presentation of the set of modified clothing images at a client device (e.g., the client device 110). The presentation module 250 may receive the set of modified images from the image module 240 and cause presentation of the set of modified clothing images in place of the set of clothing images included in a specified publication. For example, the presentation module 250 may cause presentation of a set of publications in the form of results to a search query. Upon selection of a publication of the set of publications, the presentation module 250 may identify modified images generated based on the set of images of the selected publication. Upon identification of the modified images, the presentation module 250 may present the modified images within the publication instead of the original set of clothing images. In these embodiments, each user, having a set of body coordinates associated with a user account, may be presented a unique version of the publication, with each version having a set of modified images tailored to the user who selects the publication based on that user's set of body coordinates.

In some embodiments, the presentation module 250 causes presentation of the set of clothing images in addition to the set of modified clothing images. The presentation module 250 may cause presentation of the set of modified clothing images interspersed within the set of clothing images, such that each clothing image is presented prior to a corresponding modified clothing image. In some instances, the set of modified clothing images may be presented as a set of images appended to the set of clothing images included within the publication.

The presentation module 250 may also cause presentation of the set of modified clothing images based on selection of one or more images of the set of clothing images. For example, the presentation module 250 may cause presentation of the publication without apparent modification. Upon receiving an indication of selection of an image of the set of clothing images within the publication, the presentation module 250 may present the modified clothing image corresponding to the selected image. In these instances, the client device may receive a selection or other user interaction (e.g., mouse click, tap, touch, or drag) of the image for a detailed or expanded view. The presentation module 250 receiving indication of the selection may present the modified clothing image. For example, the presentation module 250 may cause display of an expanded image based on selection of the image from the set of clothing images. The expanded image may be the modified image corresponding to the image selected from the set of clothing images. The expanded image may also be a larger version of the image selected from the set of clothing images. In this instance, a subsequent selection (e.g., click, swipe, or touch of the expanded image) causes the presentation module 250 to present an equal or substantially equal sized version of the modified image.

Figure 7:
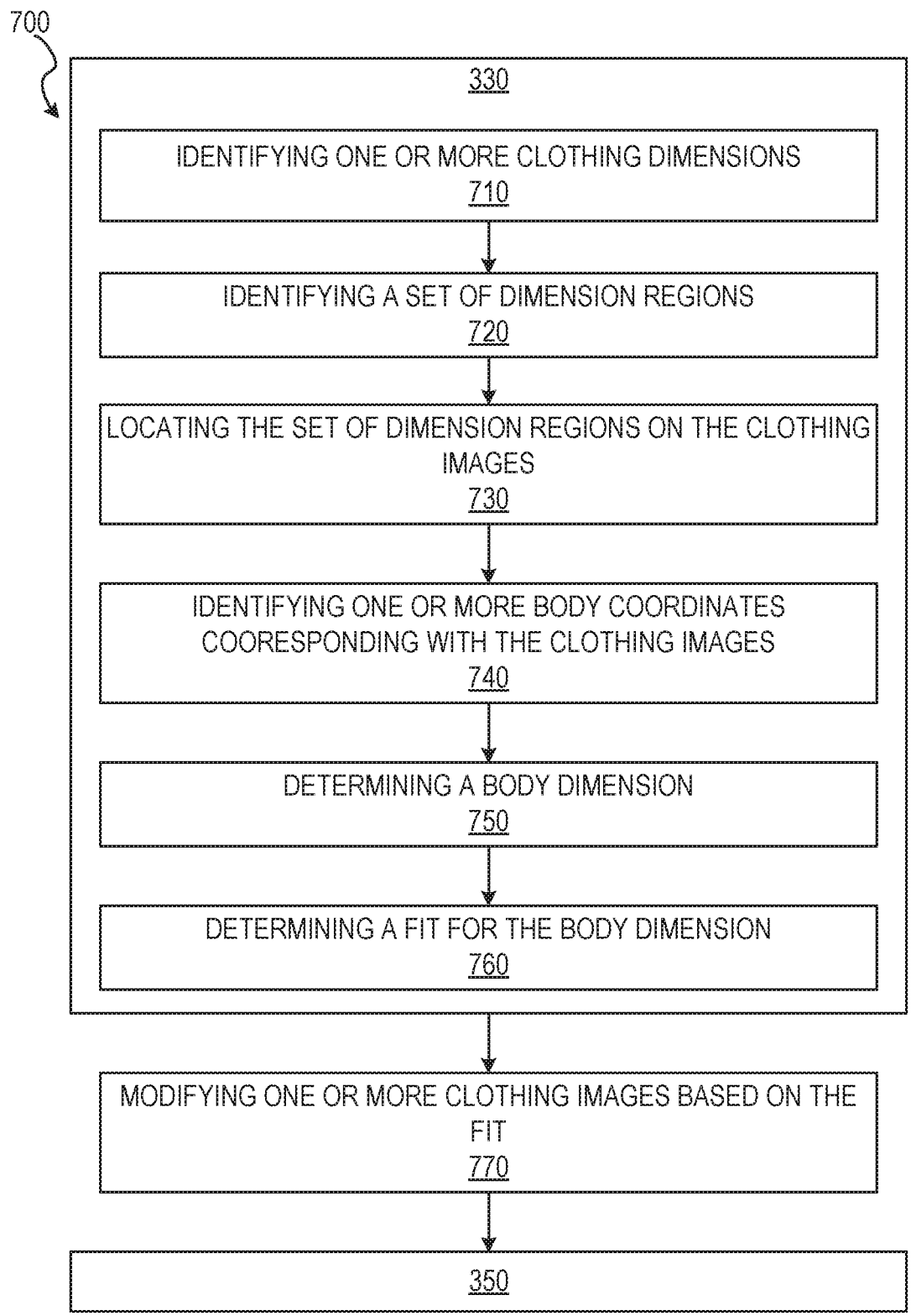
FIG. 7 is a flow chart illustrating an example method, according to various embodiments.

FIG. 7 is a flow chart of operations of a method 700 of the publication modification system 150 in performing the operation 330 for identifying the set of images, according to various example embodiments involving clothing images corresponding to the set of body coordinates. The method 700, depicted in FIG. 7, may be performed by the publication modification system 150, using modules described above with respect to FIG. 2.

In operation 710, the identification module 230 identifies one or more clothing dimensions associated with clothing depicted within the set of clothing images. The identification module 230 may identify the one or more clothing dimensions based on the clothing depicted within the set of clothing images, data associated with the images, or data associated with the publication. In some embodiments, the identification module 230 initially parses the metadata associated with the set of clothing images to identify one or more clothing dimensions including clothing size, hat size, shoe size, and clothing measurements. Where the identification module 230 identifies clothing, hat, or shoe sizes, the identification module 230 may parse the metadata of the set of clothing images.

Where the identification module 230 fails to identify the one or more clothing dimensions within the metadata for the set of clothing images, the identification module 230 may parse publication data comprising the publication associated with the set of clothing images. For example, where the publication including the set of clothing images is an item listing for clothing on an electronic commerce website, the identification module 230 may parse varying fields of the item listing. For instance, the identification module 230 may parse a title, one or more item information fields (e.g., drop down, scroll wheel, or radio button menus for sizes), and a product description field generally describing or providing specific details about the product which is the subject of the item listing. Although described with respect to specific fields or parts of an item listing or publication, it will be understood that in some embodiments having greater or fewer fields or parts of an item listing or publication, the identification module 230 may parse any suitable field or portion of the item listing or publication to identify the clothing dimensions.

In some embodiments, the identification module 230 may fail to retrieve clothing dimensions from the publication and may retrieve the clothing dimensions from a third party server (e.g., third party server 130) to identify measurements associated with the identified sizes. The identification module 230 may query a third party server, such as one associated with a manufacturer of the clothing, as determined from data associated with the publication. The identification module 230 may pass data identifying the clothing (e.g., obtained from the publication) and the size of the clothing to the third party server of the clothing manufacturer. The receiver module 210 may receive clothing dimensions or measurements associated with the specified clothing and size from the third party server. The receiver module 210 may then pass the clothing dimensions or measurements to the identification module 230.

In operation 720, the identification module 230 identifies a set of dimension regions. The set of dimension regions may include a dimension region for each of the one or more clothing dimensions. The dimension region may be a portion of clothing for which a dimension of the one or more clothing dimensions is a measure. For example, where the set of clothing images depict a shirt and the identification module 230 identifies a clothing dimension for a chest measurement, the identification module 230 may identify a dimension region for the clothing dimension (e.g., chest measurement), extending across a chest area of the shirt and intersecting or proximate to arm holes located in the shirt.

In operation 730, the identification module 230 locates the set of dimension regions on the clothing depicted within the set of clothing images. The identification module 230 may perform one or more image recognition operations to locate the set of dimension regions on the clothing depicted within the set of clothing images. For example, the identification module 230 may use edge detection methods or shape recognition methods to identify an outline of a shirt depicted within one or more clothing images of the set of clothing images. The identification module 230 may then determine, based on the outline of the shirt, the set of dimension regions for the shirt (e.g., neck region, shoulder regions, arm regions, chest region, abdominal region, and waist region). As shown in FIG. 6, where the set of clothing images depict a shirt and the identification module 230 locates a dimension region 650 for a chest measurement (e.g., a portion of the shirt at or proximate to the color area 640). The dimension region 650 for the clothing dimension (e.g., chest measurement) may extend across a chest area of the shirt and intersect or be positioned proximate to arm holes located in the shirt.

In operation 740, the identification module 230 identifies one or more body coordinates of the set of body coordinates corresponding with the clothing depicted within the set of clothing images. In some embodiments, the identification module 230 identifies the one or more body coordinates based on an association between one or more body coordinates and the one or more clothing dimensions. For example, where the clothing depicted within the set of clothing images is a shirt having chest dimensions and sleeve length dimensions, the identification module 230 may identify body coordinates associated with a chest and arms of a body. The identification module 230 may identify the one or more body coordinates based on data indicating a measurement location of a body coordinate, a position of the body coordinate relative to other body coordinates, or any other suitable identification method.

In operation 750, the identification module 230 determines a body dimension associated with the one or more body coordinates. The identification module 230 may identify a body dimension by determining a measurement corresponding with the one or more body coordinates. The body dimension may be generated based on the body coordinates (e.g., determined by generating a measurement using the one or more body coordinates). In some embodiments, the body dimension may be determined by the identification module 230 identifying a measurement associated with the one or more body coordinates and included within the body coordinate file.

In operation 760, the identification module 230 determines a fit for the body dimension based on the set of dimension regions located on the clothing. The fit may be determined based on a comparison of the body dimension and a dimension region of the set of dimension regions. The identification module 230 may determine the fit for the body dimension by determining a measurement for the body dimension is less than a measurement or dimension of a specified dimension region of the clothing. For example, where the body dimension is a chest measurement, the identification module 230 may compare the chest measurement with a dimension region for a shirt at or proximate to the position of the chest measurement. The identification module 230 may determine a fit where the chest measurement is less than a measurement for the dimension region. The identification module 230 may determine a lack of fit where the chest measurement is greater than the measurement of the dimension region. As will be explained below in more detail, the identification module 230 may determine the fit based on one or more characteristics (e.g., style of clothing, desired tit of clothing, fabric stretch of the clothing, and occasion associated with the clothing) of the clothes depicted within the set of clothes images.

In operation 770, the image module 240 modifies one or more clothing images of the set of clothing images based on the fit for the body dimension. As described above in the operation 340, the image module 240 may generate a set of modified clothing images or modify one or more clothing images of the set of clothing images. In some embodiments, upon determining a lack of fit for a specified dimension region of an article of clothing depicted in the one or more clothes images, the image module 240 may modify the specified dimension region of one or more clothes images by changing a color, generating a shape, generating and applying an overlay, or otherwise modifying the specified dimension region of the one or more clothes images.

Figure 8:
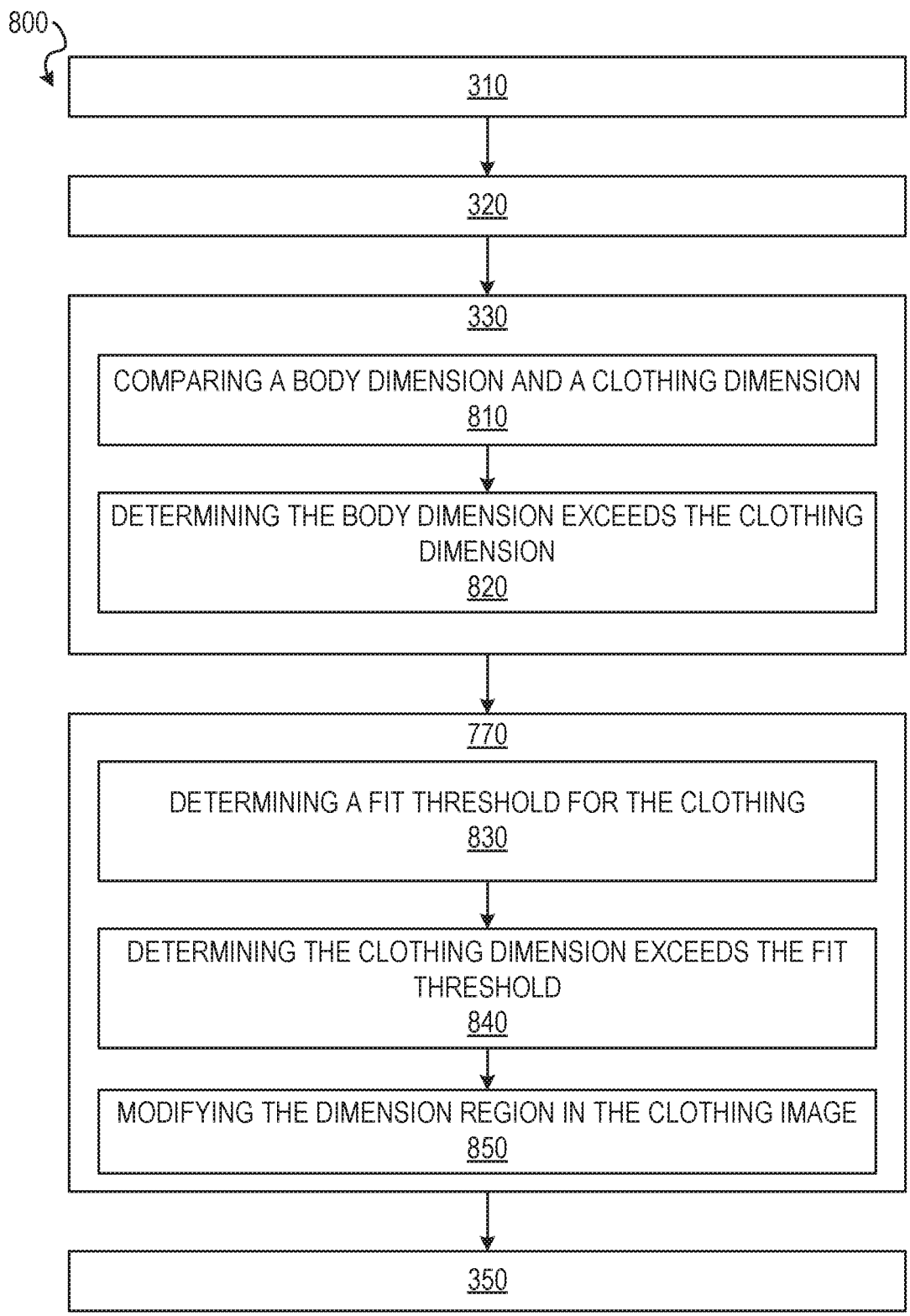
FIG. 8 is a flow chart illustrating an example method, according to various embodiments.

FIG. 8 is a flow chart of operations of the publication modification system 150 in performing a method 800 of identifying and generating a set of modified images for a publication on the network-based publication system, according to some example embodiments. The operations depicted in FIG. 8 may be performed by the publication modification system 150, using modules described above with respect to FIG. 2. In some instances, as shown in FIG. 8, the method 800 may be performed as a part of the methods 300 or 700 or may be performed as a set of sub-operations of one or more of the operations described in the methods 300 and 700.

In operation 810, the identification module 230 compares the body dimension and the clothing dimension for the dimension region. The identification module 230 may directly compare the body dimension and the clothing dimension to determine which of the body dimension and the clothing dimension is greater or lesser. In some embodiments, the identification module 230 may perform a mathematical function on the body dimension and the clothing dimension (e.g., subtracting one dimension from the other) to compare the body dimension and the clothing dimension.

In operation 820, the identification module 230 determines the body dimension exceeds the clothing dimension. The identification module 230 may determine the body dimension exceeds the clothing dimension where a measurement of the body dimension (e.g., a chest measurement of a user) is greater than a measurement of the clothing dimension (e.g., a chest measurement of a shirt). In determining the body dimension exceeds the clothing dimension, the identification module 230 may determine that the clothing does not fit the body coordinates. The identification module 230 may determine the lack of fit for a single clothing dimension to indicate that the clothing lacks a proper fit, or may determine the clothing lacks a proper fit based on comparing a plurality of clothing dimensions and body dimensions.

In operation 830, the identification module 230 determines a fit threshold for the clothing depicted within the set of clothing images. In some instances, the identification module 230 determines the fit threshold based on the comparison of the body dimension and the clothing dimension. In these instances, the identification module 230 determines a difference between the body dimension and the clothing dimension. For example, where the identification module 230 identifies the body dimension as exceeding the clothing dimension, the identification module 230 may determine an amount (e.g., a measure, proportion, or percentage) by which the body dimension exceeds the clothing dimension. The identification module 230 may determine whether the clothing fits the body dimension and the amount by which the clothing is too small. The identification module 230 may determine the body dimension exceeds the clothing dimension based on the fit threshold exceeding a predetermined threshold.

In some embodiments, the fit threshold is based, at least in part, on characteristics of the clothing depicted within the set of clothing images. For example, where the clothing is configured to stretch (e.g., exercise clothing), the clothing may have a degree of stretch which is included in the publication or the metadata of the publication or set of clothing images. The degree of stretch may be indicated by mapping a single size of the clothing to a range of sizes, a range of body measurements, or a one-size-fits-all designation. Where a size or measurement range is provided, the identification module 230 may set the fit threshold as the maximum indicated size or measurement within the specified range.

In operation 840, the identification module 230 determines the clothing dimension exceeds the fit threshold when the clothing dimension is combined with the body dimension. The identification module 230 may determine the clothing dimension exceeds the fit threshold by determining the body dimension exceeds the fit threshold or by determining that the clothing dimension, or the clothing thickness, when added to the body dimension exceeds the fit threshold.

In operation 850, the image module 240 modifies the dimension region within the one or more clothing images based on the clothing dimension exceeding the fit threshold. In some embodiments, the image module 240 receives an indication of the body dimension exceeding the clothing dimension from the identification module 230. Based on receiving the indication, the image module 240 may modify the dimension region by performing one or more operations on the image. The image module 240 may apply a color, a translucent color, a shape, a pattern (e.g., shading), an image filter, or any other suitable modification to the dimension region for which the body dimension is indicated as exceeding.

Figure 9:
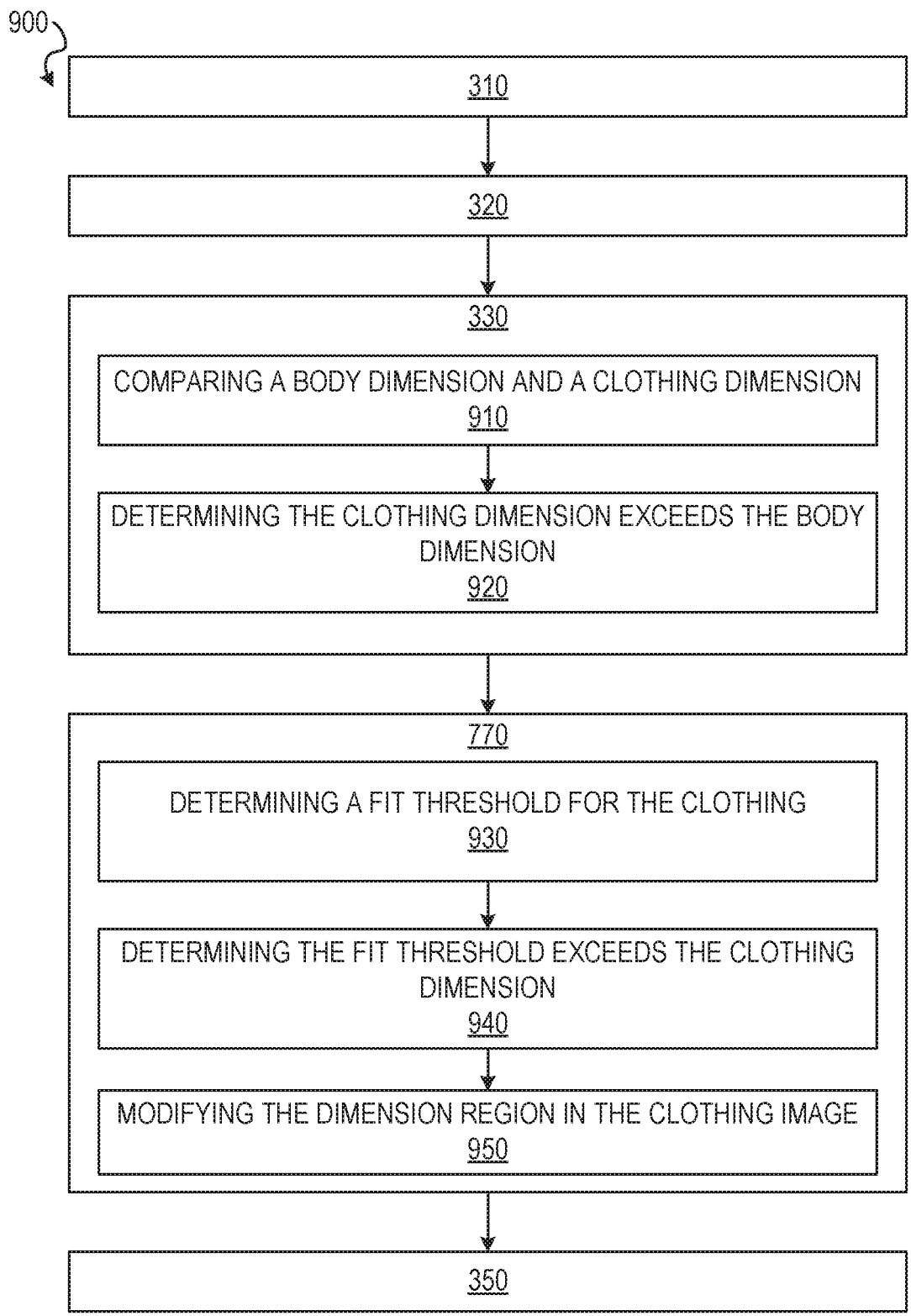
FIG. 9 is a flow chart illustrating an example method, according to various embodiments.

FIG. 9 is a flow chart of operations of the publication modification system 150 in performing operations of a method 900 of identifying and generating a set of modified images for a publication on the publication system 142, according to various example embodiments. Shown in FIG. 9 is a set of operations which may be performed as part of the method 300 or 700 or as a set of sub-operations of one or more of the operations described in the method 300 or 700.

In operation 910, the identification module 230 compares the body dimension and the clothing dimension for the dimension region. The operation 810 may be performed similarly or the same as the operation 810 described above.

In operation 920, the identification module 230 determines the clothing dimension exceeds the body dimension. The identification module 230 may determine the clothing dimension exceeds the body dimension where a measurement of the clothing dimension (e.g., a chest measurement of a shirt) is greater than a measurement of the body dimension (e.g., a chest measurement of a user). Based on the clothing dimension exceeding the body dimension, the identification module 230 may determine that the clothing does not fit the body coordinates. In these instances, one or more of the clothing dimensions exceeding the body dimension may indicate that the clothing is too large for the user based on the body coordinates and body dimensions.

In operation 930, the identification module 230 determines a fit threshold for the clothing depicted within the set of clothing images. In some embodiments, where the identification module 230 identifies the clothing dimension as exceeding the body dimension, the identification module 230 may determine an amount (e.g., a measure, proportion, or percentage) by which the clothing dimension exceeds the body dimension. In these instances, the identification module 230 may determine whether the clothing fits the body dimension and the amount by which the clothing is too large. The fit threshold, in these instances, may be a range of body dimensions which correspond to a proper fit, size, or other range corresponding to the clothing depicted within the image. Where the clothing dimension exceeds the body dimension, the identification module 230 may identify a lower bound of the fit threshold (e.g., range of suitable sizes or body dimensions).

In operation 940, the identification module 230 determines the fit threshold exceeds the clothing dimension when the clothing dimension is combined with the body dimension. The identification module 230 may determine that the fit threshold exceeds the clothing dimension when the clothing dimension, or the clothing thickness combined with the body dimension, is a measurement below the lower bound of the fit threshold.

In operation 950, the image module 240 modifies the dimension region within the one or more clothing images based on the fit threshold exceeding the clothing dimension. In some embodiments, the image module 240 receives an indication of the clothing dimension exceeding the body dimension (e.g., in excess of the lower bound of the fit threshold) from the identification module 230. Based on receiving the indication, the image module 240 may modify the dimension region by performing one or more operations on the image. The image module 240 may apply a color, a translucent color, a shape, a pattern (e.g., shading), an image filter, or any other suitable modification to the dimension region for which the clothing dimension exceeds the body dimension.

Figure 10:
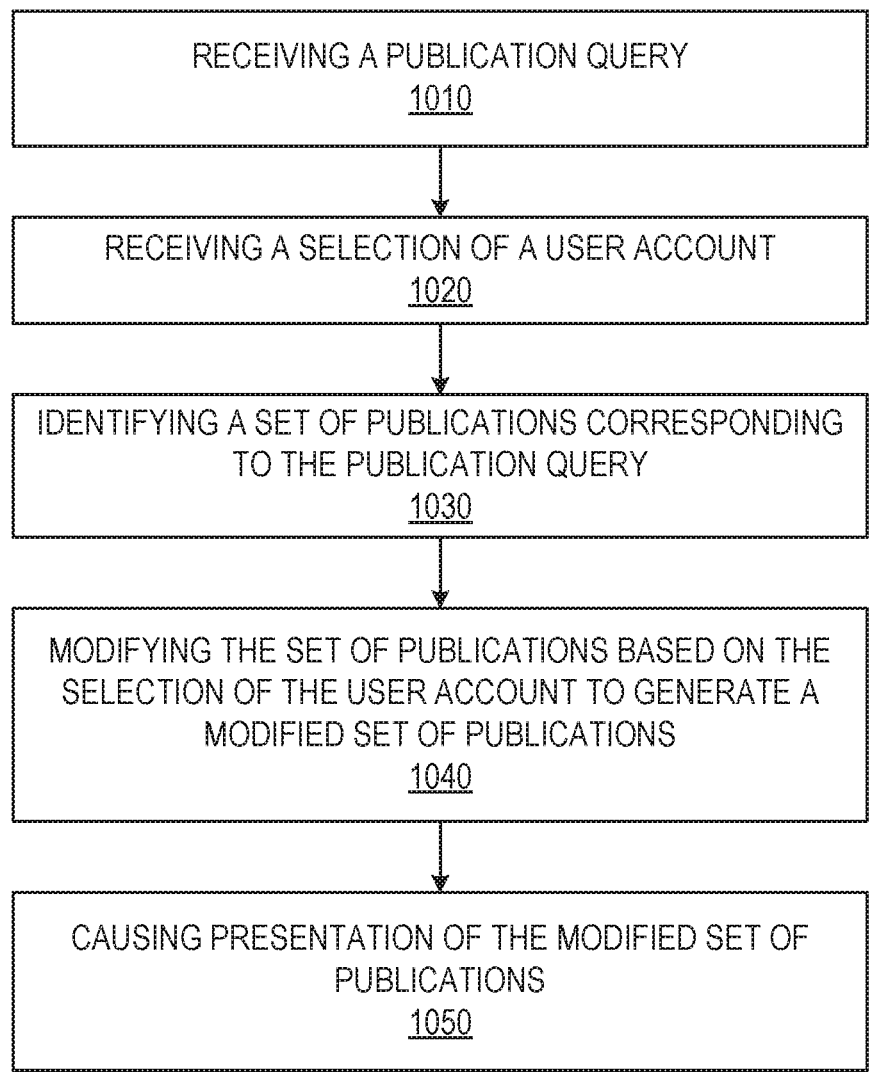
FIG. 10 is a flow chart illustrating an example method, according to various embodiments.

FIG. 10 is a flow chart of operations of the publication modification system 150 in performing a method 1000 of modifying publications within the publication system 142, according to some example embodiments, Operations of the method 1000 may be performed by the publication modification system 150, using modules described above with respect to FIG. 2.

In operation 1010, the receiver module 210 receives a publication query. The publication query may include a set of keywords, selections, or other data elements configured as a search query of the publication system 142. The publication query may be received from a browser, an application, or other user interface operating or being processed on a client device. In some instances, the publication system 142 may cause presentation of a structured or unstructured query interface enabling the client device to generate and transmit queries formatted for the network-based publication system based on input from a user.

In operation 1020, the receiver module 210 receives a selection of a user account. In some embodiments, the selection of the user account may be a selection of the first user account, with which a set of body coordinates are associated. The selection of the user account may be received from a client device (e.g., the client device 110) associated with a second user account. In these embodiments, the client device may be registered or otherwise associated with the second user account or may be operating or processing instructions from a browser or application logged into the publication system 142 via the second user account. In some instances, receipt of the selection of the first user account may indicate the second user is browsing publications on behalf of the first user. For example, the second user may select the first user account and browse item listings published on the publication system 142 in order to purchase a gift for the first user. Although the operation 1020 is presently described after the description of the operation 1010, it will be understood by one skilled in the art that the operations 1010 and 1020 may be performed in any order or performed together in a single operation.

In operation 1030, identification module 230 identifies a set of publications corresponding to the publication query. The identification module 230 may identify publications from the publication system 142 by comparing the keywords, selections, or other data elements received in the operation 1010 with metadata and data of the publications within the network-based publication system. The identification module 230 may use any suitable search engine methodologies or techniques to compare and identify the set of publications.

Figure 11:
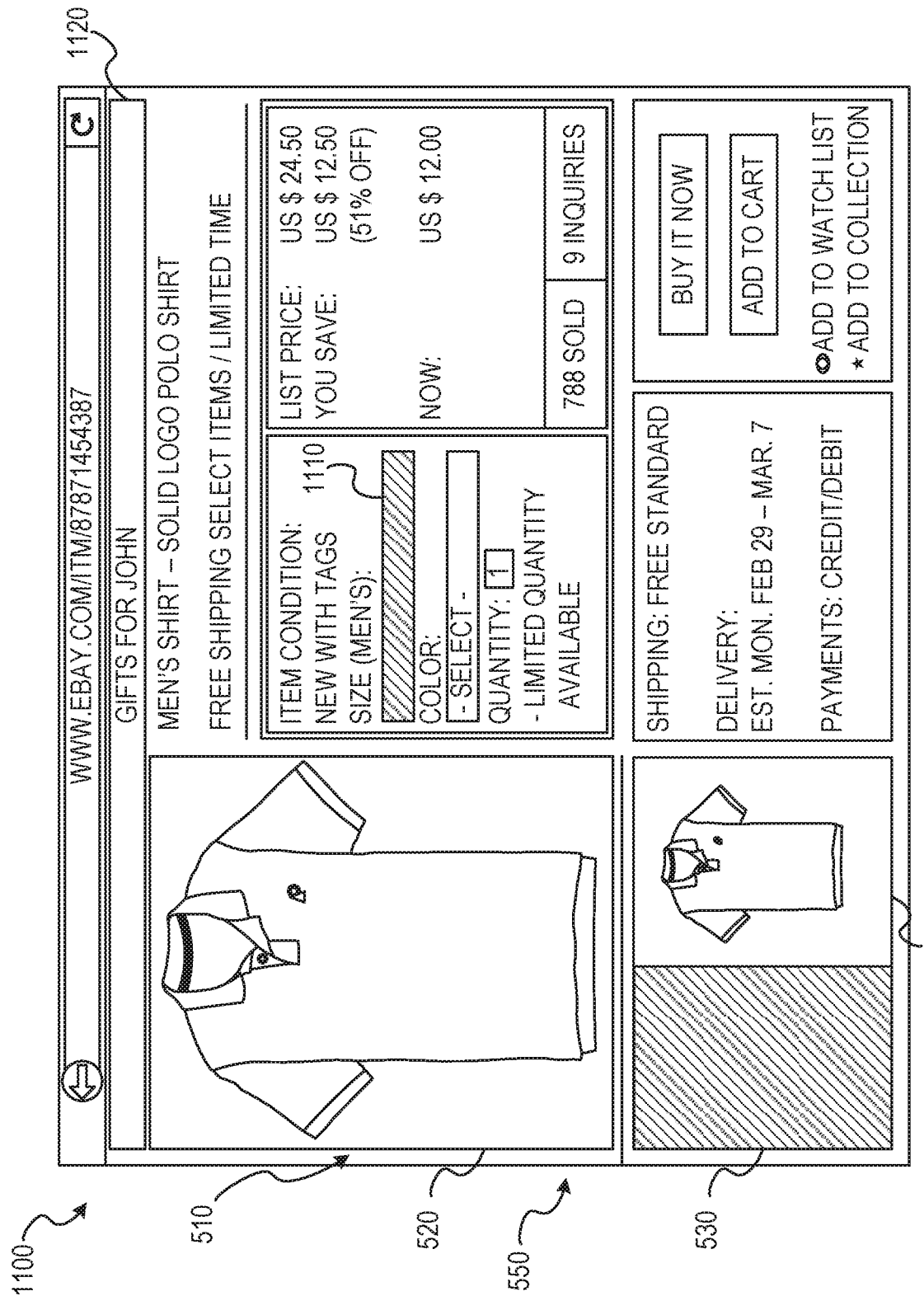
FIG. 11 is an example user interface diagram illustrating a user interface screen modified based on body coordinates, according to various embodiments.

In operation 1040, the image module 240 modifies the set of publications based on the selection of the first user account and the set of body coordinates associated with the first user account. The modification of the set of publications may generate a modified set of publications for presentation at a client device. In some embodiments, the image module 240 modifies the set of publications by removing, hiding, or obscuring one or more user interface elements of the set of publications. The image module 240 may also remove one or more images included within the set of publications. The image module 240 may also remove, hide, or obscure one or more portions of text included within the set of publications. For example, FIG. 11 shows a modified publication 1100, generated based on the publication 500, shown in FIG. 5. As shown in FIG. 11, the image module 240 removes size information from the modified publication 1100 by obscuring (e.g., graying out, removing, or precluding selection) of a size selection user interface element 1110 and removing or obscuring the image 530. In some embodiments, the image module 240 may modify the set of publications by including notification text 1120 indicating selection of the first user account.

In operation 1050, the presentation module 260 causes presentation of the modified set of publications at the client device. The presentation module 260 may provision the set of publications to a client device causing display of the set of publications, or titles, snippets, or other information representing the set of publications, within a web browser, application, or other suitable user interface. With the removal of the size information and size-related user interface elements, the identification module 230 may provide the set of body dimensions upon selection of a publication of the set of publications. For example, where the publications are item listings, the image module 240 may remove size information from the item listings and upon selection and ordering of one of the products depicted in the item listings, the identification module 230 may provide the size information, based on the set of body coordinates, into the order of the product.

According to various example embodiments, one or more of the methodologies described herein may facilitate identifying a fit of clothing depicted within a publication, determining locations on a body at which clothing will fit or will fail to fit, and providing modified images of clothing indicating fit locations. Accordingly, one or more of the methodologies described herein may have the effect of allowing a user to navigate through the selling or purchase of items for an properly fitting clothing without physically viewing or fitting the clothing. One or more of the methodologies described herein may also have the effect of allowing a user to identify and/or purchase clothing for another user, ensuring a proper fit to clothing without having access to or knowledge of a clothing size of the other user.

As a result, one or more of the methodologies described herein may obviate a need for certain efforts or resources that otherwise would be involved in research, decision-making, online shopping, and more. Efforts expended by a user in identifying a and purchasing a clothing product without physically interacting with the product may be reduced and fit may be more accurately determined based on the body coordinates and use of one or more of the methodologies described herein. Further, one or more of the methodologies described herein may enable automated fit determination. Computing resources used by one or more machines, databases, or devices (e.g., within the network environment 1200) may similarly be reduced. Examples of such computing resources include processor cycles, network traffic, memory usage, data storage capacity, power consumption, and cooling capacity. Specifically, computing resources used by machines, being directed by interactions of a user, to search for properly fitting clothing or effecting return of an ill-fitting item may be reduced or eliminated.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 2-11 are implemented in some embodiments in the context of a machine and an associated software architecture. In various embodiments, the modules, methods, applications and so forth described above are implemented in the context of a plurality of machines, distributed across and communicating via a network, and one or more associated software architectures. The sections below describe representative software architecture(s) and machine hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 12:
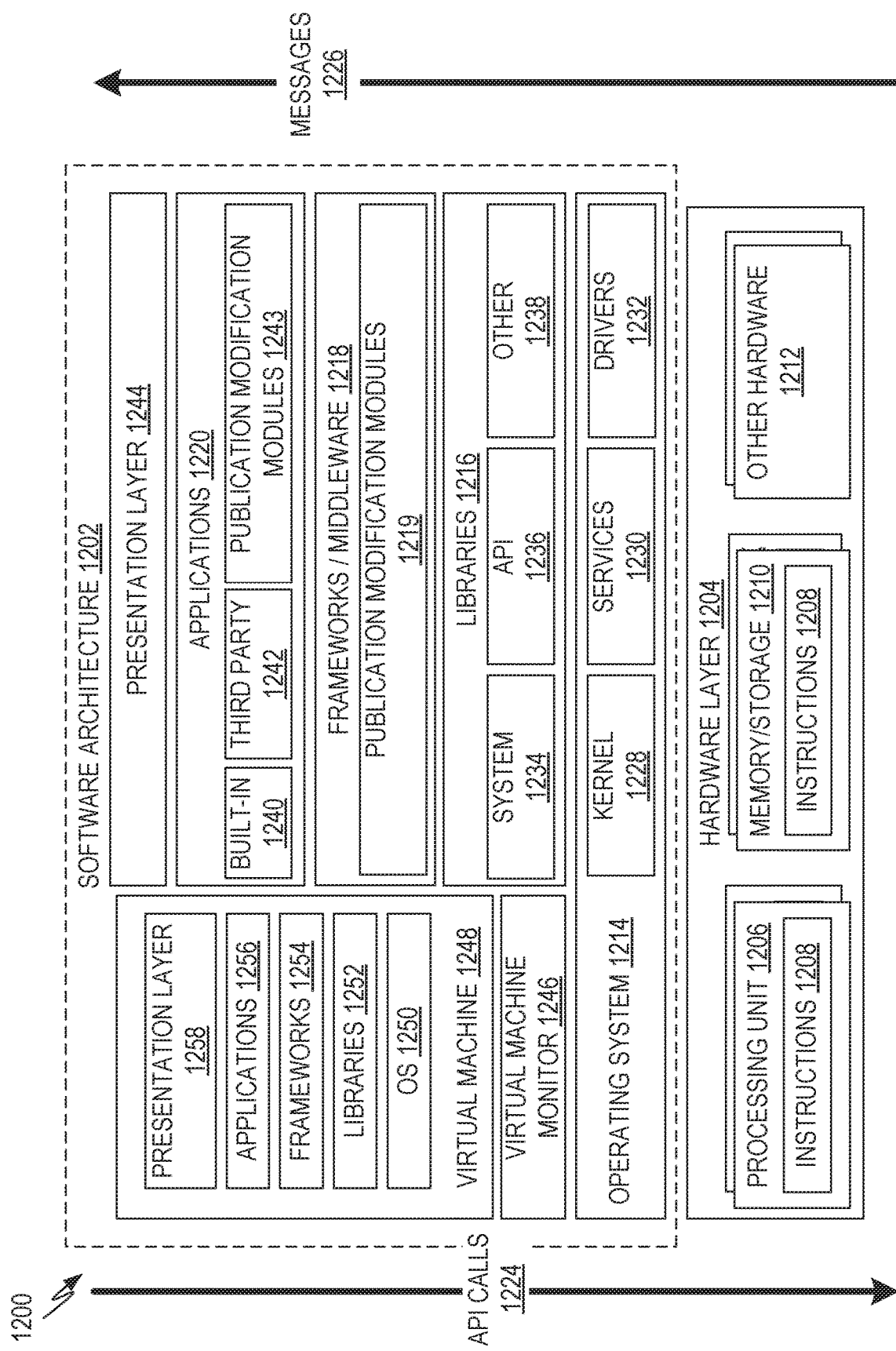
FIG. 12 is a block diagram illustrating an example of a software architecture that may be installed on a machine, according to some example embodiments.

FIG. 12 is a block diagram 1200 illustrating a representative software architecture 1202, which may be used in conjunction with various hardware architectures herein described. FIG. 12 is merely a non-limiting example of a software architecture and it will be appreciated that many other architectures may be implemented to facilitate the functionality described herein. The software architecture 1202 may be executing on hardware such as machine 1300 of FIG. 13 that includes, among other things, processors 1310, memory 1330, and I/O components 1350. A representative hardware layer 1204 is illustrated and can represent, for example, the machine 1200 of FIG. 12. The representative hardware layer 1204 comprises one or more processing units 1206 having associated executable instructions 1208. Executable instructions 1208 represent the executable instructions of the software architecture 1202, including implementation of the methods, modules and so forth of FIGS. 2-11. Hardware layer 1204 also includes memory and/or storage modules 1210, which also have executable instructions 1208. Hardware layer 1204 may also comprise other hardware as indicated by 1212 which represents any other hardware of the hardware layer 1204, such as the other hardware illustrated as part of machine 1300.

In the example architecture of FIG. 12, the software 1202 may be conceptualized as a stack of layers where each layer provides particular functionality. For example, the software 1202 may include layers such as an operating system 1214, libraries 1216, frameworks/middleware 1218, applications 1220 and presentation layer 1222. Operationally, the applications 1220 and/or other components within the layers may invoke application programming interface (API) calls 1224 through the software stack and receive a response, returned values, and so forth illustrated as messages 1226 in response to the API calls 1224. The layers illustrated are representative in nature and not all software architectures have all layers. For example, some mobile or special purpose operating systems may not provide a frameworks/middleware layer 1218, while others may provide such a layer, Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system 1234 libraries (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPREG4, H.264, MP3, AAC, AMR, NG, PNG), graphics libraries (e.g., an OpenGL, framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) may provide a higher-level common infrastructure that may be utilized by the applications 1220 and/or other software components/modules. For example, the frameworks 1218 may provide various graphic user interface (GUI) functions, high-level resource management, high-level location services, and so forth. The frameworks 1218 may provide a broad spectrum of other APIs that may be utilized by the applications 1220 and/or other software components/modules, some of which may be specific to a particular operating system or platform. In some example embodiments publication modification modules 1219 (e.g., one or more modules of the publication modification system 150) may be implemented at least in part within the middleware/frameworks 1218. For example, in some instances at least a portion of the presentation module 250, providing graphic and non-graphic user interface functions, may be implemented in the middleware/frameworks 1218. Similarly, in some example embodiments, portions of one or more of the receiver module 210, the access module 220, the determination module 230, and the generation module 240 may be implemented in the middleware/frameworks 1218.

The applications 1220 includes built-in applications 1240, third party applications 1242, and/or publication modification modules 1243 (e.g., user facing portions of one or more of the modules of the publication modification system 150). Examples of representative built-in applications 1240 may include, but are not limited to, a contacts application, a browser application, a book reader application, a location application, a media application, a messaging application, and/or a game application. Third party applications 1242 may include any of the built in applications as well as a broad assortment of other applications. In a specific example, the third party application 1242. (e.g.; an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1242 may invoke the API calls 1224 provided by the mobile operating system such as operating system 1214 to facilitate functionality described herein. In various example embodiments, the user facing portions of the publication modification modules 1243 may include one or more modules or portions of modules described with respect to FIG. 2. For example, in some instances, portions of the receiver module 210, the image module 240, the presentation module 250, and the query module 260 associated with user interface elements (e.g., data entry and data output functions) may be implemented in the form of an application of the publication modification modules 1243.

The applications 1220 may utilize built in operating system functions (e.g., kernel 1228, services 1230 and/or drivers 1232), libraries (e.g., system 1234, APIs 1236, and other libraries 1238), frameworks/middleware 1218 to create user interfaces to interact with users of the system. Alternatively, or additionally, in some systems interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware machine (such as the machine of FIG. 13, for example). A virtual machine is hosted by a host operating system (operating system 1214 in FIG. 12) and typically, although not always, has a virtual machine monitor 1246, which manages the operation of the virtual machine as well as the interface with the host operating system (i.e., operating system 1214). A software architecture executes within the virtual machine such as an operating system 1250, libraries 1252, frameworks/middleware 1254, applications 1256 and/or presentation layer 1258. These layers of software architecture executing within the virtual machine 1248 can be the same as corresponding layers previously described or may be different.

Example Machine Architecture and
Machine-Readable Medium

Figure 13:
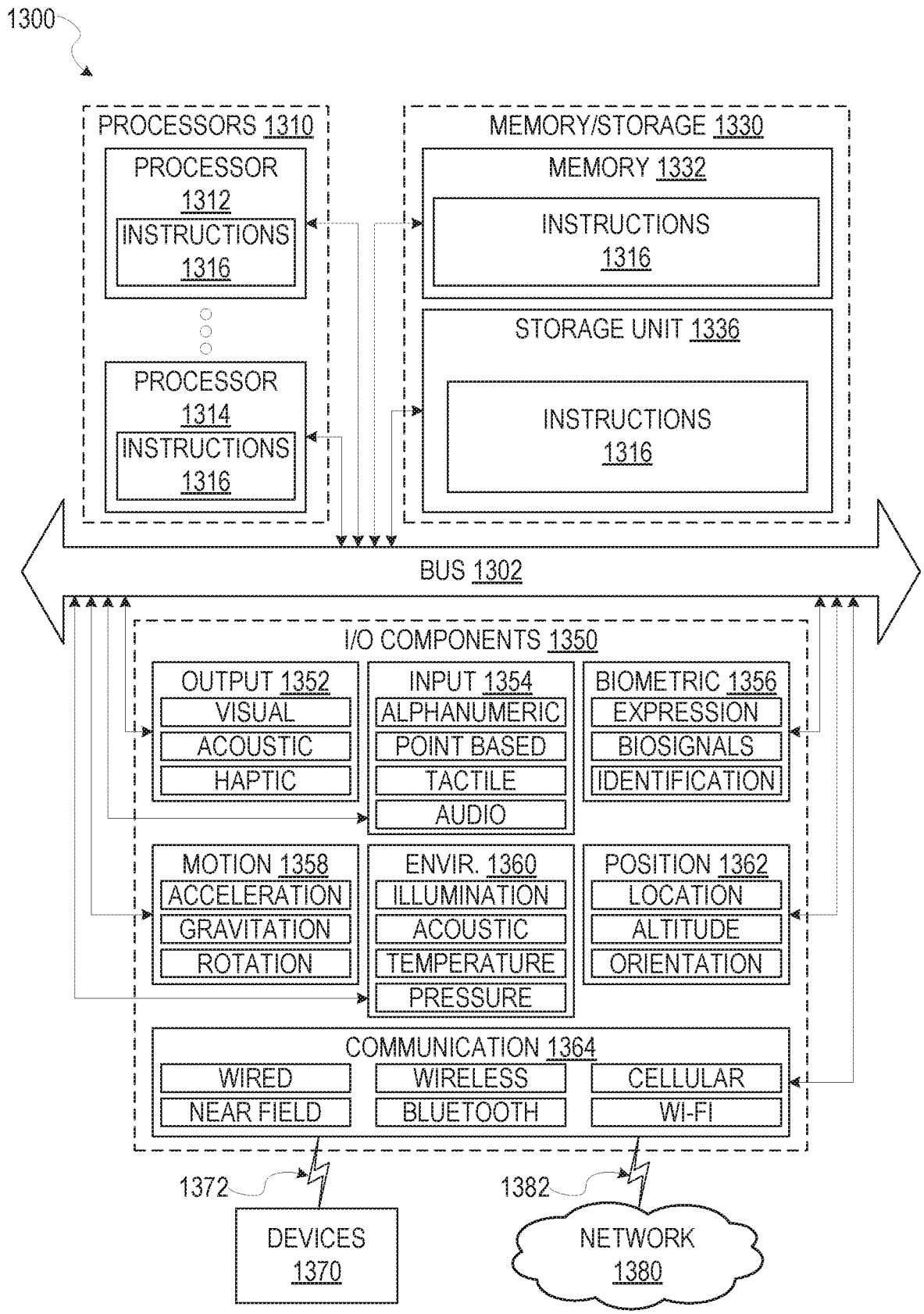
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions (e.g., processor executable instructions) from a machine-readable medium (e.g., a non-transitory machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example the instructions may cause the machine to execute the flow diagrams of FIGS. 3 and 7-10. Additionally, or alternatively, the instructions may implement the receiver module 210, the access module 220, the determination module 230, the generation module 240, the selection module 250, the presentation module 260, and the bidding module 270 of FIGS. 2-3 and 7-10, and so forth. The instructions transform the general, non-programmed machine into a particular machine programmed to carry out the described and illustrated functions in the manner described.

In alternative embodiments, the machine 1300 operates as a standalone device or may be coupled (e.g., networked) to other machines in a networked system. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (SIB), an entertainment media system, a web appliance, a network router, a network switch, a network bridge, or any machine capable of executing the instructions 1316, sequentially or otherwise, that specify actions to be taken by machine 1300. In some example embodiments, in the networked deployment, one or more machines may implement at least a portion of the modules described above. The one or more machines interacting with the machine 1300 may comprise, but not be limited to a personal digital assistant (PDA), an entertainment media system, a cellular telephone, a smart phone, a mobile device, a wearable device (e.g., a smart watch), a smart home device (e.g., a smart appliance), and other smart devices. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GM), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core process), multiple processors with a single core, multiple processors with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of processors 1310 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as; location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
receiving, by a server, a series of images from which a set of body coordinates of a first user are determined;
determining, for the first user, a body dimension associated with the set of body coordinates;
receiving, from a second user on behalf of the first user, a request to search a publication system comprising a set of clothing item images to identify an unmodified image of a clothing item having a clothing dimension corresponding to the body dimension of the first user, wherein neither the set of body coordinates nor the body dimension of the first user is revealed to the second user;

determining a degree of stretch associated with the clothing item, wherein the clothing dimension is based on the degree of stretch;

generating a modified image based on the set of body coordinates and the clothing dimension, the generating comprising applying an overlay image to the unmodified image such that the overlay image overlays at least a portion of the clothing item within the unmodified image, the overlay image associated with one or more body coordinates of the set of body coordinates; and transmitting the modified image from the server for presentation on a client device associated with at least one of the first user or the second user.

2. The method of claim 1, wherein generating the modified image further comprises:
modifying one or more color values within the unmodified image.

3. The method of claim 1, wherein generating the modified image is in response to receiving a selection of the unmodified image.

4. The method of claim 1, wherein generating the modified image further comprises:
modifying a shape within the unmodified image.

5. The method of claim 1, further comprising:
receiving a query comprising one or more characteristics of an article of clothing;
identifying one or more publications in the publication system, the one or more publications representing one or more articles of clothing associated with the one or more characteristics;
causing presentation of the one or more publications at the client device; and
receiving a selection of a publication of the one or more publications, the selected publication including the unmodified image.

6. The method of claim 1 further comprising:
identifying a dimension region for the clothing dimension of the clothing item depicted within the unmodified image, the dimension region being a portion of clothing for which the clothing dimension is a measure; and
determining a fit for the body dimension of the first user based on the dimension region located on the clothing item depicted within the unmodified image;
wherein the overlay image is generated based on the fit for the body dimension of the first user.

7. The method of claim 6, wherein determining the fit for the body dimension of the first user comprises:
comparing the body dimension of the first user and the clothing dimension for the dimension region; and
determining the body dimension of the first user exceeds the clothing dimension.

8. The method of claim 7, further comprising:
determining a fit threshold for the clothing item depicted within the unmodified image;
determining the clothing dimension exceeds the fit threshold when the clothing dimension is combined with the body dimension of the first user; and
modifying an area within the overlay image corresponding to the dimension region within the unmodified image based on the clothing dimension exceeding the fit threshold.

9. The method of claim 6, wherein determining the fit for the body dimension further comprises:
comparing the body dimension of the first user and the clothing dimension for the dimension region; and
determining the clothing dimension exceeds the body dimension of the first user.

10. The method of claim 9, further comprising:
determining a fit threshold for the clothing item depicted within the unmodified image;
determining the fit threshold exceeds the clothing dimension when the clothing dimension is combined with the body dimension of the first user; and
modifying an area within the overlay image corresponding to the dimension region within the unmodified image based on the fit threshold exceeding the clothing dimension.

11. The method of claim 1, wherein the series of images comprise a first image depicting the first user from a first viewpoint, and a second image depicting the first user from a second viewpoint that is different from the first viewpoint, and wherein the set of body coordinates of the first user are determined based on a comparison of the first image and the second image.

12. The method of claim 1, wherein the series of images comprise a first image and a second image, the method further comprising:
identifying a scale based on the first image and the second image, wherein the set of body coordinates are determined based on the scale.

13. A system, comprising:
one or more processors; and
a processor-readable storage medium storing processor executable instructions that, when executed by the one or more processors, cause the one or more processors to perform operations comprising:
receiving a series of images from which a set of body coordinates of a first user are determined;
determining, for the first user, a body dimension associated with the set of body coordinates;
receiving, from a second user on behalf of the first user, a request to search a publication system comprising a set of clothing item images to identify an unmodified image of a clothing item having a clothing dimension corresponding to the body dimension of the first user, wherein neither the set of body coordinates nor the body dimension of the first user is revealed to the second user;
determining a degree of stretch associated with the clothing item, wherein the clothing dimension is based on the degree of stretch;
generating a modified image based on the set of body coordinates and the clothing dimension, the generating comprising applying an overlay image to the unmodified image such that the overlay image overlays at least a portion of the clothing item within the unmodified image, the overlay image associated with one or more body coordinates of the set of body coordinates; and
transmitting the modified image for presentation on a client device associated with at least one of the first user or the second user.

14. The system of claim 13, wherein the operations further comprise:
modifying one or more color values within the unmodified image.

15. The system of claim 13, wherein generating the modified image is in response to receiving a selection of the unmodified image.

16. The system of claim 13, wherein the operations further comprise:
modifying a shape within the unmodified image.

17. The system of claim 13, wherein the operations further comprise:
receiving a query comprising one or more characteristics of an article of clothing;
identifying one or more publications on a network based publication system, the one or more publications representing one or more articles of clothing associated with the one or more characteristics;
causing presentation of the one or more publications at a client device; and
receiving a selection of a publication of the one or more publications, the selected publication including the unmodified image.

18. The system of claim 13, wherein the operations further comprise:
identifying a dimension region for the clothing dimension of the clothing item depicted within the unmodified image, the dimension region being a portion of clothing for which the clothing dimension is a measure; and
determining a fit for the body dimension of the first user based on the dimension region located on the clothing item depicted within the unmodified image;
wherein the overlay image is generated based on the fit for the body dimension of the first user.

19. A non-transitory processor-readable storage medium comprising processor executable instructions that, when executed by one or more processors of a machine, cause the machine to perform operations comprising:
detecting, at a client device, an input comprising a series of images from which a set of body coordinates of a first user are determined;
determining, at the client device, a body dimension of the first user associated with the set of body coordinates;
transmitting, from the client device, the set of body coordinates of the first user to a server configured to search a publication system comprising a set of clothing item images to identify an unmodified image of a clothing item having a clothing dimension corresponding to the body dimension of the first user, wherein neither the set of body coordinates nor the body dimension of the first user is revealed to a second user, wherein the clothing dimension is based on a degree of stretch associated with the clothing item;
receiving, at the client device, the unmodified image of the clothing item from the server;
generating, at the client device, a modified image based on the set of body coordinates of the first user and the clothing dimension, the generating comprising applying an overlay image to the unmodified image such that the overlay image overlays at least a portion of the clothing item within the unmodified image, the overlay image associated with one or more body coordinates of the set of body coordinates of the first user; and
displaying the modified image on a graphical user interface of the client device.

* * * * *